United States Patent
Susnjara et al.

[11] Patent Number: 5,808,888
[45] Date of Patent: Sep. 15, 1998

[54] METHOD AND APPARATUS FOR PROGRAMMING A CNC MACHINE

[75] Inventors: Kenneth J. Susnjara, Santa Claus, Ind.; Philip J. Poth, Seattle, Wash.

[73] Assignee: Thermwood Corporation, Dale, Ind.

[21] Appl. No.: 586,251

[22] Filed: Jan. 11, 1996

[51] Int. Cl.⁶ .................................................. G05B 19/423
[52] U.S. Cl. ............... 364/191; 364/474.18; 364/474.37; 364/551.02
[58] Field of Search .................................. 364/191, 192, 364/193, 188, 189, 167.01, 551.02, 474.37, 560, 474.03, 474.18; 318/568.1, 568.16, 568.22, 568.13, 568.14; 901/3–5, 46; 395/93, 95, 99, 901

[56] References Cited

U.S. PATENT DOCUMENTS

| | | | |
|---|---|---|---|
| 4,105,937 | 8/1978 | Tuda et al. | 364/193 X |
| 4,484,293 | 11/1984 | Minucciani et al. | 364/474.37 X |
| 4,799,170 | 1/1989 | Nakaya et al. | 364/560 X |
| 4,882,527 | 11/1989 | Yakuyama et al. | 318/568.13 |
| 5,016,199 | 5/1991 | McMurtry et al. | 364/474.03 X |
| 5,115,401 | 5/1992 | Oyama et al. | 364/474.37 |
| 5,138,563 | 8/1992 | Debitsch et al. | 364/560 |
| 5,212,646 | 5/1993 | McMurtry | 364/474.03 |
| 5,594,668 | 1/1997 | Bernhardt et al. | 364/560 X |

*Primary Examiner*—Joseph Ruggiero
*Attorney, Agent, or Firm*—Lalos & Keegan

[57] ABSTRACT

A method and apparatus for programming the motion of a machine tool in a three-dimensional machining space defined by an X, Y and Z coordinate system, the machine tool having a spindle linearly displaceable in three orthogonal X, Y and Z axes and rotatable about two mutually perpendicular A and C axes within the machining space. A probe, mounted in the spindle and coupled to transducers, is moved by hand through a desired cutting path for an actual part. A computer connected to the transducers moves the machine in the direction that the probe is moved and selectively records the position of the probe to create an NC parts program that replicates the cutting path motions.

24 Claims, 3 Drawing Sheets

METHOD AND APPARATUS FOR PROGRAMMING A CNC MACHINE

BACKGROUND OF THE INVENTION

The present invention is related to numerical control (NC) and more particularly to computer numerical control (CNC). Numerical Control is the generic term applied to the automation of general purpose machine tools. Such automation is achieved through electronics and, utilizing computers, such automation has become more flexible and efficient.

A "five axis" machine is one that provides for linear motion along mutually orthogonal X, Y and Z axes of a fixed coordinate system and includes a head that is rotative about two axes within the coordinate system, generally referred to as the A and C axes. One advantage of numerical control is the ability to accurately position the axes of a machine and control the cutting feeds and speeds for a machining pattern that can be repeated for each workpiece. This positioning and control information (the NC data) makes up an NC program or part program which is created by a tooling engineer (programmer). NC programs are stored in a memory of the CNC control system (hereinafter referred to generally as the controller) after the programs have been loaded into the memory through a punched tape, for example. In more sophisticated controllers, portions of the NC program can be created and loaded directly into the controller memory by "teaching" the machine with a hand held programmer. Once the NC program is written and stored in the controller, manual action is normally limited to setting up the part, starting the CNC controller which executes the program, and carrying out any necessary manual operations such as tool changes. The NC program, when executed by the controller directs the machine through a series of fabrication steps. For example, where the machine includes a cutting tool the cutting tool is directed relative to the workpiece to make a series of cuts (straight line or circular) in accordance with a series of NC program instructions. These instructions direct the tool as to where the workpiece is to be cut and in what order the cuts are to be made.

Most NC and CNC systems are programmed according to a standard of the Electronic Industries Association designated as EIA RS 274-D. The part program (or NC code making up the program) can be created through various methods, most of which are available to users of a commercial CNC system, namely the 91000 SuperControl, available from Thermwood Corporation, Dale, Ind. The most direct method is for a programmer to write the code, line by line, on a personal computer (PC) using a text editor. This requires that the programmer have knowledge of all of the EIA codes, the required syntax and the ability to calculate positions and movements.

Another method available is a menu-driven system (commonly called conversational programming) in which the "programmer" simply responds to queries from the controller and fills in the blanks in a displayed "form". The controller then creates the NC code required to generate the motions defined by the programmer.

Another method of creating NC code for a part program is through use of a Computer Aided Design/Computer Aided Manufacturing (CAD/CAM) system. Using a CAD/CAM system, the programmer first defines the geometry of the part and then the cutting path. The system software then determines the motions of a particular machine required to produce the desired cut path and then generates the NC program code needed to effect the desired cut path on the particular machine. This system has certain disadvantages. CAD/CAM software capable of generating five axis NC programs is expensive and requires substantial training to operate. The program is generated with the assumption that the particular machine on which it will run is geometrically precise and accurate. Any inaccuracy in the actual machine or head results in an inaccurate cut path when the program is executed. Also, certain processes used to manufacture a part which is to be trimmed by the machine under program control may be at variance with the original part design used in creating the NC program. This is especially true for certain plastic processes, e.g. thermoforming, which heat the material for forming and then cool the material into the final shape. Part shrinkage during cooling may not be predictable so that the final part may not exactly match the CAD/CAM design. Thus, the trim path may be inaccurate.

Yet another method available on the SuperControl is through a Hand Held Programmer that is used to perform conversational programming. This method allows the programmer to get physically close to the machine and carefully observe positions and movements while generating the program. The actual machine is moved around the cutting path for an actual pre-trimmed part, defining program points at appropriate intervals. This method has the advantage of accounting for inaccuracies in the machine and variances between the actual part and its original design. While such system requires less training than the CAD/CAM or other programming methods, this method does require a level of technical training and occupies the machine during program development, which reduces its availability for production. On the Thermwood SuperControl, the Hand Held Programmer may be used to create a program consisting only of major points needed to define the cut path. These major points can then be loaded into the CAD/CAM system to create the final part program. This hybrid approach has the advantage of accounting for inaccuracies in the part and/or machine while providing the smooth and fast program attributes of the CAD/CAM system. A disadvantage is that the programmer must be skilled in both the Hand Held Programmer and the CAD/CAM system and substantial machine time is still required to program the major points.

SUMMARY OF THE INVENTION

The present invention provides a novel system for creating a parts program for linear movement of a machine tool within a three dimensional space defined by an X, Y and Z coordinate system and rotative movement about two mutually perpendicular axes within such space. Such programs control the movements of a five axis machine and the cutting path of the machine can be programmed using the present invention with less training and utilizing less machine time than prior methods and apparatus.

The programming system of the present invention includes a probe that mounts in the head of the machine for which the program is being created. The probe has a shape and geometry that substantially corresponds to the cutting bit that will be used in the actual machining process. The probe is connected to a computer that is in turn connected to motors for driving the machine in the X, Y and Z directions. The probe is pushed by hand in the direction of the desired cutting path. Transducers coupled to the probe convert the displacement of the probe into an electrical output representative of magnitude and direction of the probe displacement, i.e. a displacement vector. Such displacement vector is used by the computer to control the motors to drive the machine in the direction (X, Y or Z) in which the probe is pushed. Thus, if the probe is pushed in the X direction, the machine with head and probe attached will move in the X direction until the probe is no longer pushed. This provides a normal, intuitive feel to the probe. The computer will record the position of the probe at selected times under operator control to obtain selected points along the cutting path or will sample the position of the probe at very high speed (e.g. every 6 ms) to obtain a continuum of position points along the cutting path. These position points are stored in a file that can later be read (e.g. by a CAD/CAM system or the parts program system software of the controller) to create a part program in a conventional manner. The position of the probe within the space defined by the X, Y and Z coordinate system is obtained by the computer from incremental encoders on the drive motors. Initially, the machine will be placed in a "home" position within the movement space of the machine and the encoders are reset. As the machine moves from the "home" position, the computer can determine its movement from the incremental encoders and calculate its position in a conventional manner.

In addition, the orientation of the probe can be changed by rotating the machine head about two mutually perpendicular axes, generally referred to as the A (horizontal) and C (vertical) axes. Two rotary knobs, when actuated, cause the machine head with probe attached to rotate about the A and C axes. Position encoders on the rotary knobs are fed to the computer so that the orientation of the probe is recorded as well as its position within the X, Y and Z coordinate space.

Thus, the operator of the present invention can lead the machine through a desired cutting path around a part to be cut, pushing the probe in the cutting path direction and changing the probe orientation, if necessary, while recording the position and orientation of the probe. This accurate record of the cutting path can then be utilized by the controller to create a parts program. The present invention thus provides an alternative system for creating path position information that is easier to learn and operate than the prior CAD/CAM and Hand Held Programmer systems, is less expensive than the CAD/CAM system and requires less machine time than the Hand Held Programmer system.

DETAILED DESCRIPTION

Figure 1:
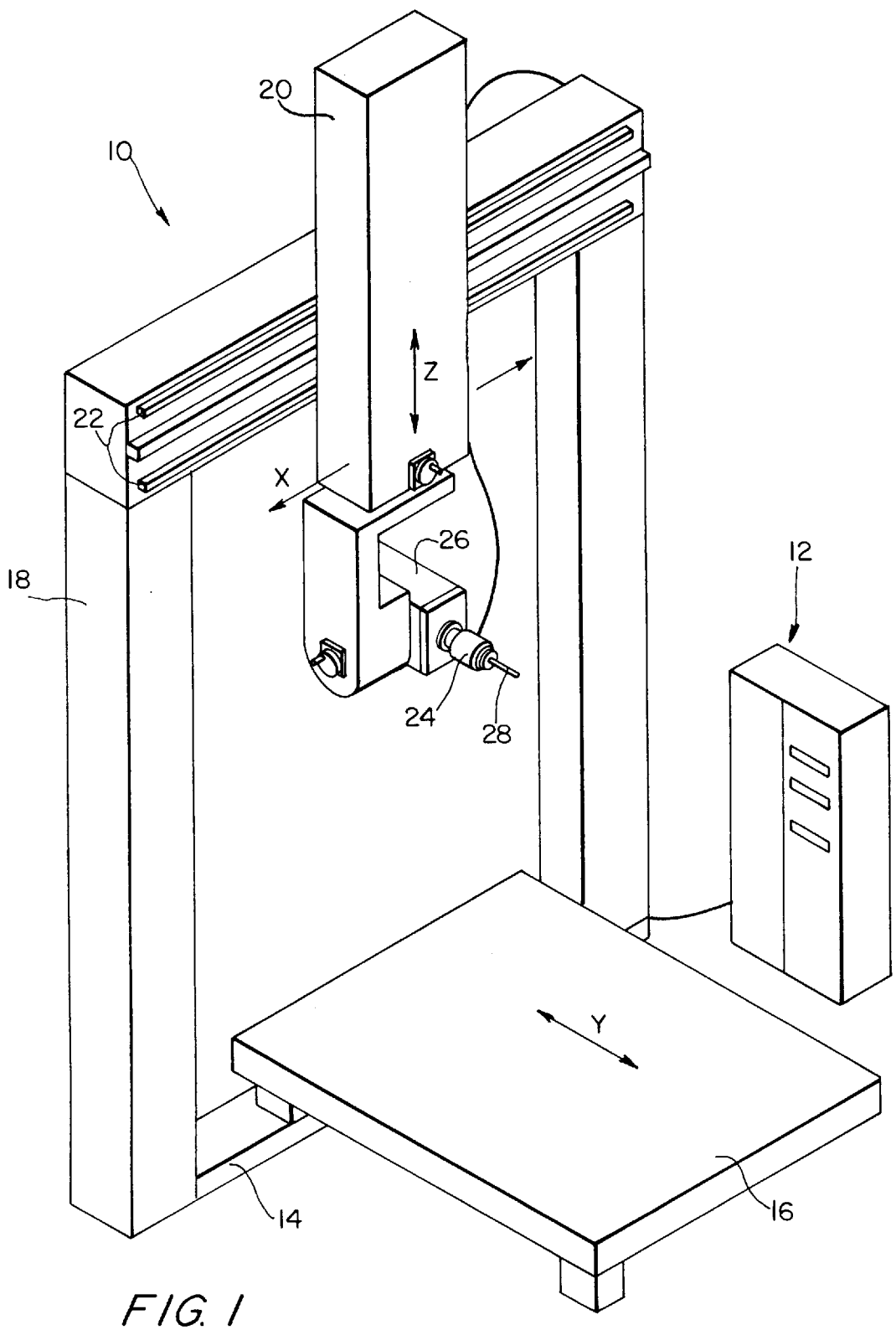
FIG. 1 is a perspective view of a CNC machine equipped with the parts programming components of the present invention.

FIG. 1 illustrates a CNC machine 10 connected to a controller 12 for displacing a tool of the machine in accordance with an NC parts program stored within the controller. The machine and the attached tool move within a three dimensional machine space defined by an X, Y and Z coordinate system. The machine 10 includes a base 14 and a table 16 displaceable relative to each other in the Y direction along trackways (not shown). Machine 10 further includes a bridge or gantry 18 and a toolhead support assembly 20 that is displaceable relative to gantry 18 in the X direction along trackways 22 and in the Z direction along rails (not shown). The mechanisms for displacing the toolhead in the three dimensional machine space are well known and a detailed discussion is not necessary for an understanding or appreciation of the present invention.

The present invention includes a probe housing 24 mounted in the spindle of the toolhead 26 in place of the cutting tool that will be used with the machine to perform the cutting operation. The probe housing 24 is rigidly fixed so that it does not rotate. A probe 28 is mounted in the housing 24. The size and shape of the probe 28 is selected to match the size and shape of the cutting bit that will be used in the actual machining operation.

Figure 2:
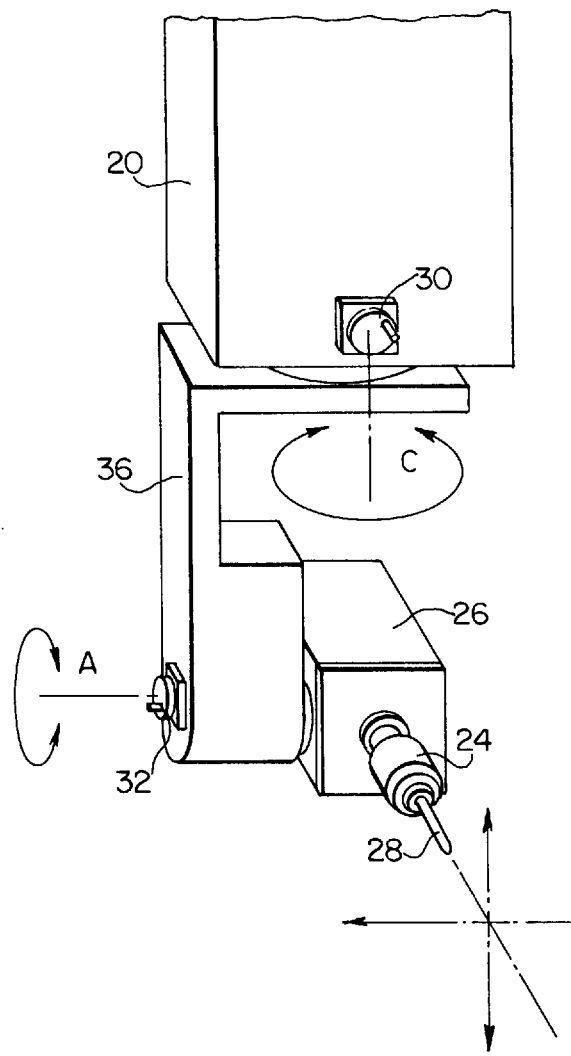
FIG. 2 is a partial perspective view of the CNC machine toolhead assembly with the programming probe of the present invention installed in place of a cutting tool.
Figure 3:
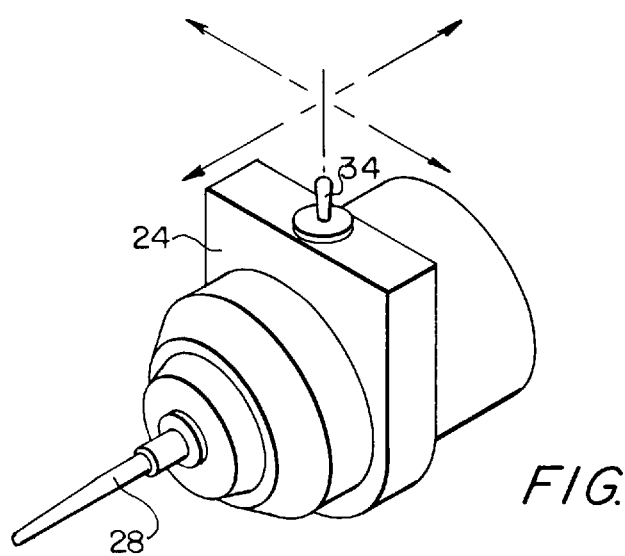
FIG. 3 is a partial perspective view of the probe housing of the present invention with a joystick mounted to effect rotary movement.

As best seen in FIG. 2, the orientation of the toolhead 26 and thus the orientation of the probe housing 24 and probe 28 in the three dimensional machining space can be changed by turning rotary knobs 30 and 32. Turning rotary knob 30 will cause the probe 28 to rotate about axis C and turning knob 32 will cause probe 28 to rotate about axis A, as shown by the arrows. Toolhead support bracket 36 is journaled in assembly 20 for rotative movement about the C axis and toolhead 26 is journaled in support bracket 36 for rotative movement about the A axis. Alternatively or in combination, the rotary knobs 30, 32 are replaced or supplemented with a joy stick 34, as shown in FIG. 3, for effecting a change in the probe orientation. Moving the joy stick parallel to the longitudinal axis of the probe causes rotation about the A axis and moving the joy stick transverse to the longitudinal axis of the probe causes rotation about the C axis.

Figure 4:
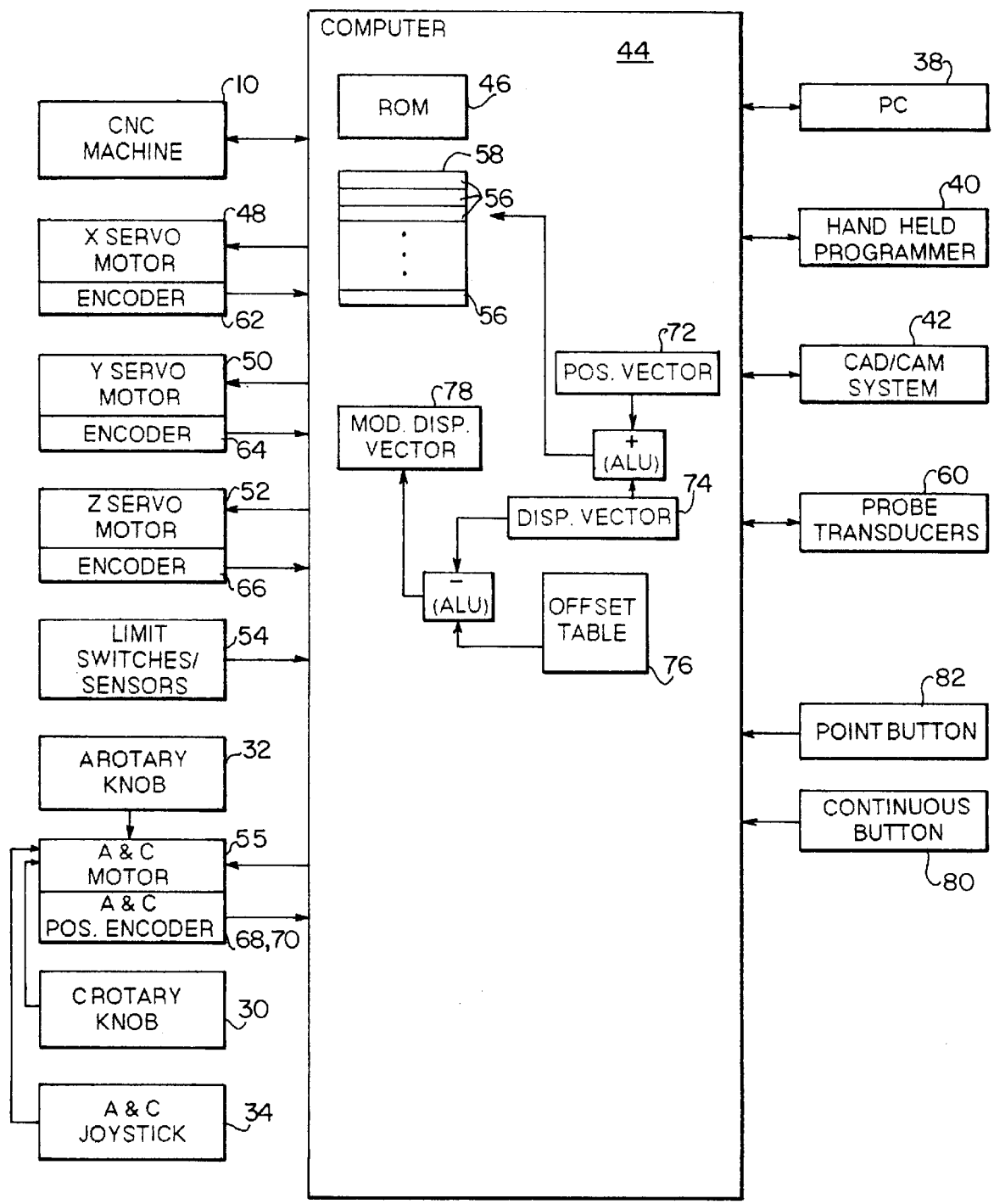
FIG. 4 is a schematic block diagram of the present invention.

FIG. 4 illustrates in block diagram form the major components of the present invention. Controller 12, e.g. the 91000 SuperControl, available from Thermwood Corporation, Dale, Ind., is programmed to create NC parts programs from cutting path information supplied to it. Controller 12 then uses this NC parts program to direct the CNC machine 10 through a series of fabrication steps. As previously discussed, the cutting path data can be created in a variety of ways including programming on personal computer (PC) 38, defining the path with the Hand Held Programmer 40, utilizing the CAD/CAM system 42, or a combination of such devices. The present invention provides a simpler and less expensive alternative.

In operation of the present inventions initially the CNC machine 10 is moved under control of computer 44 in controller 12 and system software in a Read Only Memory (ROM) 46, for example, to a "home position", i.e. a known position within the machining space defined by the X, Y and Z coordinate system. Computer 44 activates each of the X, Y and Z servo motors 48, 50 and 52, respectively to move CNC machine 10 along each of the X, Y and Z axes until limit switches or sensors 54 are tripped indicating the machine in the home position. Also, computer 44 activates the A and C axis motors 55 (or single motor with a translational device for driving both axes) to orient the toolhead 26 in a home position, again defined by limit switches or sensors 54. With machine 10 in the home position, computer 44 resets all cutting path memory locations 56 that are stored in Random Access Memory (RAM) 58.

In order to define a desired cutting path for a part, an operator pushes probe 28 in the direction he wants the machine to move. This movement can be nonlinear. For example, the movement may be along a curved surface requiring the machine to traverse a path along two or three axes simultaneously. At the same time, the operator may want to change the orientation of the toolhead 26 by turning rotary knobs 30 and 32 or joystick 34. When probe 28 is pushed (or pulled) it is displaced within probe housing 24 and is mounted to allow movement of about 4500 microns in any direction from the housing centerline. The probe is mounted such that, when it is pushed or pulled, it is displaced within the probe housing but its longitudinal axis remains parallel to the longitudinal centerline of the probe housing and toolhead.

Probe transducers 60 coupled to the probe 28 convert the displacement of the probe into an electrical output representative of the magnitude and direction of the probe displacement, i.e. a displacement vector 74. Such displacement vector is fed to computer 44 which utilizes it for two purposes. First, the displacement vector is broken down into its X, Y and Z axis components, which components are used to control the X, Y and Z axis servo motors 48, 50 and 52 to move the machine 10 in the direction of the probe displacement. Thus, if the probe is pushed in the X direction, the machine 10 is moved in the X direction until the probe is no longer displaced off center. The further the probe is pushed within the probe housing (i.e. the greater the magnitude of deflection or displacement off center) the faster the motor(s) move. An important consideration is the gravitational effect on the probe, i.e. its weight. If the probe is not vertical, it is pulled (displaced) off center by gravity. In order to account for the probe weight, initially the probe is oriented in a horizontal position and then allowed to move under its own weight to a vertical position while the computer continuously records the deflection as an offset vector. Thus, an offset vector that reflects the weight of the probe is recorded for each orientation of probe in an offset table 76. The computer then modifies (e.g. subtracts) the recorded offset vector associated with the current probe orientation from the current displacement vector received from the probe transducers to calculate a modified displacement vector 78. The modified displacement vector 78 is used by the computer to control the motors. Computer software and programs for providing basic analysis and control as described herein with respect to computer 44 are well known in the art and a detailed discussion is not necessary for an understanding or appreciation of the present invention.

As each of the axis motors 48, 50 and 52 move machine 10, incremental encoders 62, 64 and 66, indicate how far from the home position the machine has moved in each of the X, Y and Z directions. The computer 44, connected to each encoder, then calculates the exact position of the machine in the X,Y,Z machining space from the increment count received from each encoder. Similarly, the orientation of the toolhead is derived from encoders 68 and 70 associated with the A axis and C axis, respectively. Thus, the encoders 62, 64, 66, 68 and 70 indicate the position of the machine, toolhead and probe within the machining space. This position is represented in computer 44 as a position vector 72. However, in order to obtain the exact position of the probe in recording the desired cutting path, the deflection or displacement offset of the probe from the toolhead/probe housing centerline must be accounted for. Computer 44 thus adds the displacement vector to the position vector before recording the sum in a path memory location 56.

The operator selects one of two methods for recording position points along the cutting path as traversed by the probe 28. The first method is activated by pressing control button 82 (Point Button) which causes the computer 44 to record in path memory 58 the current position of each of the five axes, corrected for probe deflection (displacement). Thus, each time Point Button 82 is pressed, the current corrected position of the probe is recorded, and a sequence of such points is recorded to define the cutting path. The controller 12 will access the path memory 58 to create an NC part program that will consist of a series of linear motions whose end points correspond to the positions where the programming Point Button was pressed.

The second method for recording position points along the cutting path is activated by pressing control button 80 (Continuous Button) which causes the computer 44 to record in path memory 58 the current corrected position at a high sample rate, e.g. every 6 ms. Once the cutting path record is complete, the position data in memory 58 are processed to ensure that the resulting cutting motion, which was defined by hand movement of the probe, is smooth. The derivative of acceleration is limited for each axis to ensure such smooth motion. The recorded positions in memory 58 are converted by computer 44 into encoder counts/axis. At each recorded point, the vector sum of all axis encoder counts is calculated as the square root of $X^2+y^2+Z^2+C^2+A^2$. This vector sum is compared to a predetermined value which if selected low enough for each particular application will ensure smooth axis motion. If the vector sum is greater than the predetermined value then the encoder counts/axis are converted back to axis position data and written into a location in the continuous path memory 84. If the vector sum is less than the predetermined value, the vector sum representing the next position point is added until the predetermined value is reached.

The NC parts program resulting from the recorded path positions is offset once the probe is removed and replaced with the actual cutting bit. The programmed cutting position data will be modified with reference to the longitudinal axis of the probe by a value equal to the difference in length between the probe and the actual cutting tool. This difference is accounted for using a conventional five axis tool length compensation method.

From the foregoing detailed description, it will be evident that there are a number of changes, adaptations and modifications of the present invention that come within the province of those having ordinary skill in the art to which the present invention pertains. However, it is intended that all such variations not departing from the spirit of the invention be considered as within the scope thereof as limited solely by the following claims.

We claim:

1. A device for programming the motion of a machine tool in a three-dimensional machining space defined by an X, Y, and Z coordinate system, said machine tool having a spindle linearly displaceable in three orthogonal X, Y, and Z axes, comprising
   - a probe mounted in said spindle;
   - a transducer coupled to said probe and responsive to a displacement force applied to said probe for generating a displacement vector representative of the magnitude and direction of said displacement force;
   - a computer connected to said transducer for receiving said displacement vector; and
   - a drive means connected to said computer and responsive to said computer for moving said machine tool along at least one of said X, Y and Z axes commensurate with said displacement vector.

2. A device as in claim 1 further including:
   - a position determining means for determining the position of said probe in said three-dimensional machining space; and
   - said computer being connected to said position determining means and including a memory for storing a vector representative of a position of said probe in said three-dimensional machining space as determined by said position determining means.

3. A device as in claim 2 further including a position sampling means connected to said computer for causing said computer to store a vector representative of a present position of said probe each time said position sampling means is actuated.

4. A device as in claim 3 wherein said spindle is rotatable about two mutually perpendicular A and C axes within said machining space and further including:

an orientation determining means for determining the rotative position of said probe about said first and second axes; and said computer being connected to said orientation determining means for storing a representation of said probe rotative position in said memory each time said position sampling means is actuated.

5. A device as in claim 3 further including a probe housing for mounting said probe in said spindle and wherein said probe is mounted in said probe housing for lateral displacement therein and wherein said lateral displacement is represented by said displacement vector.

6. A device as in claim 5 wherein said computer includes means for adjusting said vector representative of a present position of said probe by said displacement vector.

7. A device as in claim 2 wherein said memory includes a plurality of storage locations for storing a plurality of position vectors representing a plurality of sequential positions of said probe.

8. A device as in claim 2 further including a position sampling means connected to said computer for causing said computer to store a plurality of vectors representing a plurality of sequential positions of said probe.

9. A device as in claim 2 wherein said position determining means includes encoders coupled to said drive means.

10. A device as in claim 9 wherein said drive means include servo motors.

11. A device as in claim 1 wherein said computer includes a memory for storing a plurality of weight offsets representing a displacement of said probe caused by gravitational force at a plurality of probe orientations.

12. A device as in claim 11 wherein said computer includes means for adjusting said displacement vector by a weight offset.

13. A device as in claim 1 wherein said spindle is rotatable about two mutually perpendicular A and C axes within said machining space and further including:

a rotary positioning means for rotating said spindle and probe mounted therein about said A and C axes; and rotary position indicating means for indicating the rotative position of said spindle and probe about said A and C axes, said rotary position indicating means being connected to said computer.

14. A device as in claim 13 wherein said rotary positioning means includes first and second rotary knobs and a drive motor responsive to actuation of said first and second rotary knobs for rotating said spindle and probe about said A and C axes.

15. A device as in claim 14 wherein said rotary positioning means includes a joystick and a drive motor responsive to actuation of said joystick for rotating said spindle and probe about said A and C axes.

16. A method of programming the motion of a machine tool in a three-dimensional machining space defined by an X, Y, and Z coordinate system, said machine tool having a spindle linearly displaceable in three orthogonal X, Y, and Z axes comprising:

mounting a probe in said spindle;

coupling a transducer to said probe;

applying a displacement force to said probe for generating a displacement vector representative of the magnitude and direction of said displacement force;

receiving said displacement vector in a computer; and moving said machine tool along at least one of said X, Y and Z axes commensurate with said displacement vector under control of said computer.

17. A method as in claim 16 further including the step of determining a weight offset representing a displacement of said probe caused by gravitational force for a plurality of probe orientations.

18. A method as in claim 17 further including the step of adjusting said displacement vector by a weight offset prior to moving said machine tool.

19. A method as in claim 16 further including determining the position of said probe in said three-dimensional machining space and storing a vector representative of a position of said probe.

20. A method as in claim 19 wherein said step of determining the position of said probe includes the steps of determining an inexact position of said probe from position encoders and then adjusting said inexact position by said displacement vector to determine an exact position of said probe before storing a vector representation of said probe position.

21. A method as in claim 20 including storing a plurality of vector representations of a sequence of probe positions to represent a path of movement of said probe.

22. A method as in claim 21 wherein said spindle and probe mounted therein are rotatable about two mutually perpendicular A and C axes within said machining space and further including the steps of:

actuating rotary positioning means for moving said spindle and probe about said A and C axes;

determining the rotative position of said spindle and probe; and storing a representation of said rotative position with said stored vector representation of said probe position in said three-dimensional machining space.

23. A method as in claim 19 further including actuating a position sampling means to cause said vector representation of a probe position to be stored at a selected time.

24. A method as in claim 19 further including actuating a position sampling means to cause a continuum of vector representations of probe positions to be stored for a selected period.

* * * * *